United States Patent [19]
Castro

[11] Patent Number: 5,136,176
[45] Date of Patent: Aug. 4, 1992

[54] CHARGE DOMAIN SYNAPSE CELL

[75] Inventor: Hernan A. Castro, Shingle Springs, Calif.

[73] Assignee: Intel Corporation, Santa Clara, Calif.

[21] Appl. No.: 747,640

[22] Filed: Aug. 20, 1991

[51] Int. Cl.$^5$ ............................................ H03K 19/00
[52] U.S. Cl. .................................... 307/201; 364/807
[58] Field of Search ............. 307/201, 490, 498, 501, 307/503, 145; 364/513, 807

[56] References Cited
U.S. PATENT DOCUMENTS
5,028,810 7/1991 Castro et al. ...................... 307/201

*Primary Examiner*—David Mis
*Attorney, Agent, or Firm*—Blakely, Sokoloff Taylor & Zafman

[57] ABSTRACT

A semiconductor charge domain synapse cell has a capacitor coupled between an input line and an intermediate node. A high-to-low voltage transition applied to the input line causes charge transfer from one summing line to the intermediate node through a first device having a programmable threshold. A second device then transfers the charge from the intermediate node to another summing line in response to the next low-to-high transition of the input. The amount of charge transferred is proportional the amplitude of the pulsed input, the programmed voltage threshold, and the capacitance value.

23 Claims, 7 Drawing Sheets

FIG_1

FIG_2

FIG_3

FIG_4

FIG_5

FIG_6

FIG_7

FIG_8

FIG_9

FIG_10

FIG_11

FIG_12

FIG_13

FIG_14

CHARGE DOMAIN SYNAPSE CELL

RELATED APPLICATIONS

This application is related to several co-pending applications entitled: "Multi-Quadrant Charge Domain Synapse Cell", Ser. No. 07/747,642; filed Aug. 20, 1991; and "Resistive Charge Domain Synapse Cell", Ser. No. 07/747,803; filed Aug. 20, 1991; which applications are assigned to the assignee of the present invention.

FIELD OF THE INVENTION

The present invention relates to the field of neural nets for simulating processes that are thought to occur in the brain. More specifically, the invention pertains to semiconductor circuits utilized in neural nets for emulating the function of a biological synapse.

BACKGROUND OF THE INVENTION

Great strides have been made recently in the field of artificial intelligence toward developing electronic circuits which emulate higher order functions performed by the human brain and the brains of other animals. These circuits are commonly known as neural networks. They generally take the form of a matrix comprised of a set of horizontal lines which cross and are coupled to a set of vertical lines. The horizontal lines simulate the functions of axons in the cortex of the brain and provide the inputs to the network. The vertical lines simulate the function of dendrites. The vertical lines are terminated at summing devices which replicate the function of the neuron cell body. Examples of such networks can be found in U.S. Pat. Nos. 4,950,917; 4,906,865; and 4,904,881.

Within a neural network, electrical circuits are employed to model the function of a biological synapse. Collectively, these circuits provide a connection between the horizontal and vertical lines of the network. Individual synapse cells provide a weighted electrical connection between an input and summing element (i.e., a neuron body). The relative strength of the connection often changes during the training or learning process.

In earlier work, electrical synapse cells were implemented using ordinary digital resistor and/or digital-to-analog converters to provide the weighting factor or function. More recently, floating gate devices—which modulate the current flow depending on the value of a stored charge—have been employed for this purpose. Examples of semiconductor synapse cells which employ floating gate devices in this manner are found in U.S. Pat. Nos. 4,956,564; and 4,961,002.

Electrical synapse cells may be either analog or digital in nature. For an analog implementation, the weighted sum of input signals is usually computed by summing analog currents proportional to the product of the inputs, with stored weights. In such a cell, considerations of cell size and resolution of the connection weight must be carefully balanced. Furthermore, in those types of networks which employ a pulsed analog input voltage, there is a need to maintain accurate frequency, amplitude, and duty cycle control of the analog input signal. At high frequencies, this is often difficult to achieve.

As will be seen, the present invention discloses a novel synapse cell which operates by transferring packets of charge between associated vertical dendrite lines. The invention has the advantage of providing one, two, or four-quadrant multiplication of an input voltage vector and a stored weight. Moreover, the invented synapse cell benefits from a very low device count and is ideally suited for networks which implement the Sigmoid function as part of the summing process. The invented cell can operate in a fully analog mode, or alternatively, it can operate digitally. Digital operation is useful for performing pattern recognition tasks and for computing results such as the Hamming distance between two binary patterns. The present invention also obviates the need for accurate control of input amplitude and duty cycle.

SUMMARY OF THE INVENTION

The present invention covers a semiconductor charge domain synapse cell for use within a neural or associative network. The cell is preferably programmed to establish a weighted connection between an input vector applied to the network along a plurality of input lines, and a corresponding plurality of output summing lines coupled to neural summing devices.

In one embodiment, a capacitor is coupled between an input line and an intermediate node of the cell. The input line delivers a pulsed input voltage to one terminal of the capacitor. A first device means having a programmable voltage threshold is employed for transferring a packet of charge from one of the summing lines to the intermediate node in response to a high-to-low transition of the pulsed input voltage. A second device means then transfers the charge packet, or a fraction thereof, from the intermediate node to the other summing line. This latter transition occurs in response to the next low-to-high transition of the input pulse following the high-to-low transition.

In accordance with the present invention, for fixed amplitude signals the magnitude of the total charge transferred is given as a function of the number of pulses (or frequency) of the pulsed input and the programmed voltage threshold. In a preferred embodiment, the first device means is realized with a floating gate field-effect device, wherein the voltage threshold of the device is programmed by transferring charge onto the floating gate member.

The basic one-quadrant charge domain synapse cell is shown to be extendable to two-quadrant or four-quadrant operation. For a four-quadrant multiplication, electrical charge is stored on the floating gate members of the various devices according to a predetermined pattern. The adopted pattern corresponds to the stored weight of the cell.

DETAILED DESCRIPTION

A semiconductor synapse cell for implementing variable resistance connections between an axon and an input dendrite output is described. In the following description, numerous specific details are set forth, such as specific voltages, conductivity types, configurations, etc., in order to provide a thorough understanding of the present invention. It will be obvious, however, to one skilled in the art that these specific details are not essential to practicing the present invention. In other instances, well-known structures and circuits have not been shown or explained in detail in order to avoid unnecessarily obscuring the present invention.

The Basic Charge-Coupled Cell

Figure 1:
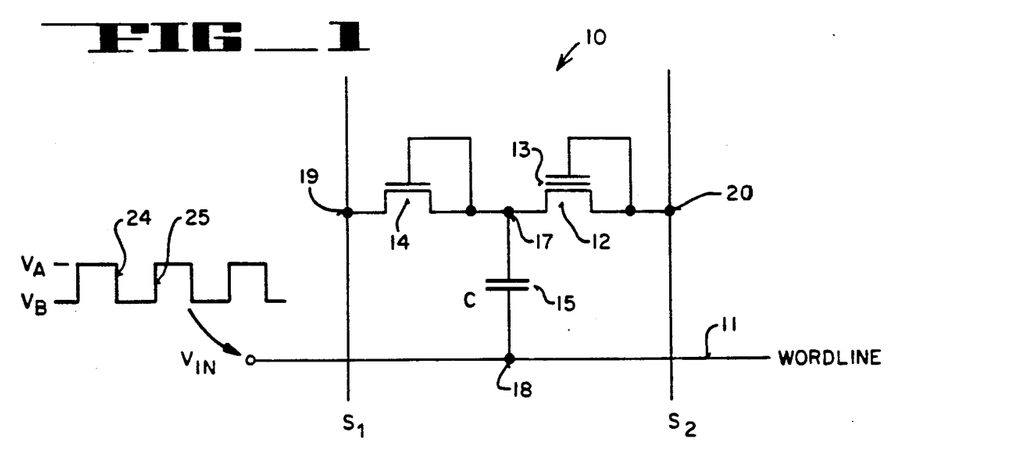
FIG. 1 illustrates the basic one-quadrant synapse cell of the present invention.

Referring to FIG. 1, the one-quadrant charged coupled synapse cell 10 of the present invention is shown. The basic operating premise of cell 10 is that charge is transferred from summing line $S_2$ to line $S_1$ through devices 12 and 14 in response to an input voltage signal $V_{IN}$, being applied to wordline 11. An array of individual cells 10 is employed within a neural network to implement the multiplication between an input voltage vector and a stored weight matrix.

In FIG. 1, device 14 comprises an ordinary n-channel field-effect device having its drain coupled to summing line $S_1$ at node 19, and its source coupled to an intermediate node 17. A capacitor 15 couples intermediate node 17 to node 18 of wordline 11. Similarly, device 12 comprises an ordinary floating gate field-effect device having its drain coupled to intermediate node 17 and its source coupled to node 20 of summing line $S_2$. The gate of device 14 is shown being coupled to intermediate node 17 while control gate of floating gate device 12 is likewise coupled to node 20. Note that device 12 includes a floating gate 13 which is programmed to store a charge which controls the conductivity across the channel of device 12. This aspect of the present invention will be discussed in more detail below.

All of the components of synapse cell 10 may be fabricated using a conventional metal-oxide-semiconductor (MOS) process flow. Capacitor 15 is preferably fabricated using first and second polysilicon layers. The first and second polysilicon layers form the respective plates of the capacitor, with a silicon dioxide or equivalent dielectric layer providing an insulative layer between the polysilicon layers. Similarly, floating gate 13 is preferably fabricated from a first polysilicon layer. The control gate of device 12 is fabricated from a second polysilicon layer. It is appreciated that a variety of processing techniques and process flows may be employed to fabricate each of the components depicted in cell 10 of FIG. 1.

Figure 2:
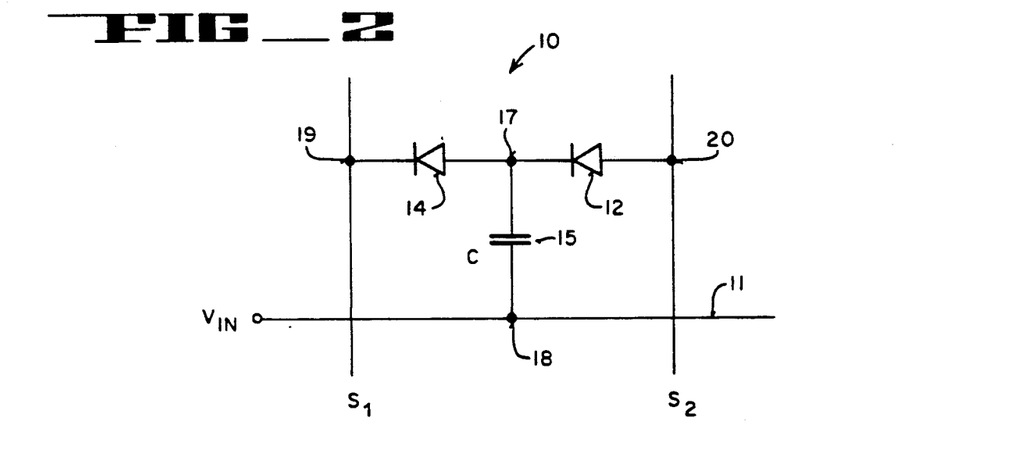
FIG. 2 is an operationally equivalent circuit schematic diagram of the synapse cell shown in FIG. 1.
Figure 8:
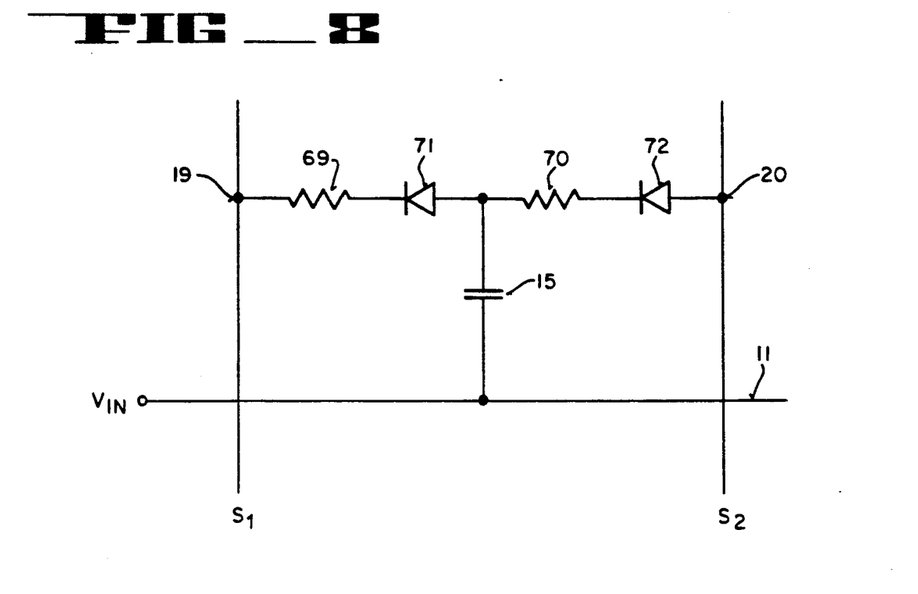
FIG. 8 illustrates a one-quadrant synapse cell with programmable resistive elements.

Functionally, devices 12 and 14 operates as equivalent diode means having programmable threshold voltages, as represented in FIG. 2. FIG. 8 shows another embodiment of cell 10 which utilizes programmable resistances 69 and 70 coupled in series with diodes 71 and 72. These resistors can simply be the effective resistances of the MOS devices and can be used to further advantages as will be described later. The following example helps to explain the operation of the present invention.

With continuing reference to FIGS. 1 and 2, and ignoring the effect of series resistance for now, assume that field-effect device 14 is a zero-threshold device. In the configuration of FIG. 1 device 14 functions as a diode which permits current to flow from node 17 to node 19 only. Further assume that floating gate device 12 has not been programmed (e.g., its voltage threshold, $V_T$, is zero). As configured, device 12 functions as a zero-threshold diode coupling nodes 20 and 17. As a set of initial conditions, assume that a potential of about 2.0 volts is present at nodes 17, 19 and 20, and that the input voltage $V_{IN}$ coupled to wordline 11 is at a "high" voltage (e.g., $V_A = 2$ volts). Under these initial conditions there is zero charge across the plates of capacitor 15.

At high-to-low transition 24 of the input pulse train, node 18 drops to zero volts. By virtue of capacitor 15, the potential at node 17 also drops by an amount $V_A$. In this case, node 17 drops to zero volts. In response to the voltage drop experienced at node 17, charge flows from summing line $S_2$ (i.e., node 20) to intermediate node 17. Since we have assumed that floating gate device 12 has a threshold equal to zero volts, node 17 eventually charges back up from zero to two volts. When node 17 is at two volts, it again matches the column reference voltage present at node 20. Thus, after transition 24, and just prior to transition 25, a two volt difference appears across capacitor 15.

The quantity of charge Q transferred from line $S_2$ to node 17 is described by the equation $$Q = C(V_A - V_{T12}); \quad V_A = V_{S2}$$

where C represents the capacitance of capacitor 15, $V_{S2}$ is the reference voltage associated with summing line $S_2$, $V_A$ is the amplitude of the $V_{IN}$ pulse, and $V_{T12}$ is the voltage threshold of floating gate device 12. Note that in practice, the charge transferred is normally reduced by parasitic capacitance elements associated with node 17. However, this effect can be compensated for by simply increasing the amplitude of the input signal.

In response to low-to-high transition 25, the voltage at node 18 rises up to $V_A$ (e.g., 2 volts), wherein the voltage at intermediate node 17 is instantaneously driven to four volts. Assuming that summing line $S_1$ was also charged to an initial voltage of two volts, the difference in potential between nodes 17 and 19 causes charge to flow from node 17, through field-effect device 14, onto summing line $S_1$. Since device 14 is a zero-threshold device, charge will flow in the direction from node 17 to node 19 until the potential of these nodes is equal. To summarize this point, one cycle of the input $V_{IN}$ causes a charge Q to be dumped from line $S_2$ to line $S_1$ through devices 12 and 14.

More generally, assuming that the characteristic relaxation time of node 17 is much shorter than the pulse widths of the input signal, and given the following conditions, $$V_A < (V_{S2}, V_{S2}) < V_B$$

$$V_{T14} < V_{T12} < (V_A - V_B)$$

where $V_B$ is equal to the input pulse low level, then the charge transferred per cycle is given by the equation $$Q = C\{(V_{S2} - V_{T12}) + (V_A - V_B) - (V_{S1} + V_{T14})\}$$

This simplifies to the earlier equation for the case where $V_{S2} = V_{S1}$; $V_{T14} = V_B = 0$ V.

A salient feature of the present invention is the fact that the configuration of devices 12, 14 prevents charge from flowing from node 19 to node 17 or from node 17 to node 20 in response to a transition of the input $V_{IN}$. The reason why charge cannot be transferred under these conditions is because devices 12 and 14 are configured as equivalent diode means. The rectifying nature of these diodes prohibits current or charge flow in any direction except from summing line $S_2$ to summing line $S_1$.

It should be apparent that summing lines $S_1$ and $S_2$ can be treated as providing differential output lines for synapse cell 10. In this respect, perhaps the easiest circuit implementation is to maintain one of the summing lines at a constant voltage (e.g., $S_2 = 2$ volts) and allow the other summing line to rise or fall in response to the applied input voltage pulse train. More accurate summing is performed by also maintaining summing line $S_1$ at a constant voltage and integrating the charge. This way only one integration is required. Practitioners in the art will further appreciate that allowing the summing lines $S_1$ and $S_2$ to rise or fall in response to the applied input signal imposes an automatic squashing (e.g., Sigmoid) behavior. After a certain differential voltage is reached across summing nodes $S_1$ and $S_2$, increasing this differential voltage further becomes less efficient. (In most neural networks, the Sigmoid calculation is carried out after, and distinct from, the calculation of the sum of products.)

As previously discussed above, a packet of charge gets transferred from node 20 to node 19 with every cycle of $V_{IN}$. If the input is coded as a number of pulses N, or as a frequency, then the total charge transferred during a certain time period can be expressed mathematically by the equation $$Q_T = N C(V_A - V_{T12}); V_A = V_{S2}$$

where N is the number of pulses during the time period considered, $V_A$ is the amplitude of the input voltage pulse train, C is the capacitance associated with capacitor 15, $V_{S2}$ is the potential of line $S_2$, and $V_{T12}$ is the threshold of device 12. For this calculation, the weight can be defined as $$\text{Weight} = (V_A - V_{T12})$$

Thus, the described synapse cell calculates a product of the input times the weight. Note that summing lines $S_1$ and $S_2$ may be forced to a reference potential by means of an operational amplifier.

Conversely, the input can be coded as an amplitude with a fixed number of pulses or even a single pulse. In this case, $$Q/\text{pulse} = \left\{ \begin{array}{l} C(V_A - V_{T12}) \text{ if } V_A \geq V_{T12} \\ 0; \text{ otherwise} \end{array} \right\}, V_A < V_{S2}$$

The above mode of operation calculates a difference of the input amplitude $V_A$ and the stored weight $V_{T12}$ at every synapse. Difference calculating synapses of this type are required in certain neural network architectures.

When dual power supplies are employed, the restriction that $V_A < V_{S2}$ is removed. If $V_A$ exceeds $V_{S2}$ in single supply operation, negative voltages below ground can be generated which could possibly activate parasitic bipolar devices within the circuits. Bipolar operation would interfere with proper synapse functionality.

Referring once again to FIG. 1, the amount of charge transferred from node 20 to node 17 during a high-to-low transition at the input is a function of the voltage threshold of floating gate device 12. In the earlier example, device 12 was assumed to have zero threshold voltage such that the charge transferred during transition 24 was simply proportional to the product of voltage $V_A$ and capacitance C. If we change the conditions in the above example and assume that device 12 has been programmed to some finite threshold voltage (e.g., $V_T = 0.5$ volts), then node 17 charges to a voltage reduced by that threshold voltage (e.g., $V_{17} = V_A - V_{T12} = 1.5$ volts). Hence, the voltage threshold of floating gate device 12 acts to reduce or limit the amount of charge transferred from node 20 to node 17 during a high-to-low transition of the input. Restated in different terms, the programmed threshold of device 12 establishes the stored weight of synapse cell 10.

Similarly, field-effect device 14 may also have a non-zero voltage threshold. Even further, it may comprise a floating gate device like device 12. It should be apparent that having a non-zero threshold device coupled between nodes 17 and 19 means that the amount of charge transferred in response to transition 25 will be limited. In other words, only a fraction of the charge on node 17 gets dumped onto line $S_1$ for this situation. The fractional amount of charge transferred is determined in part by the magnitude of the finite voltage threshold of device 14. For the case in which both devices are non-zero threshold devices, the net charge can be determined by either or both device thresholds.

Weight Setting

It should be understood at this point that each of the floating gate devices appearing in the various embodiments of the present invention are employed in some way for storage of a weight pattern—the pattern being itself represented by an electrical charge stored on the floating gate members of the devices. Weights may be either digital or analog in nature.

Recharging and discharging of the floating gate members takes place in a manner well known in the prior art. That is, programming and erasing typically take place by the dual mechanisms of hot-electron injection and Fowler-Nordheim tunnelling. By way of example, device 12 may be programmed by means of hot electron injection by raising the drain and control gate terminals to a high positive potential. A high positive voltage on the control gate of device 12 causes electrons to tunnel through the thin oxide nearest the drain for subsequent capture by floating gate 13, thereby raising (i.e., programming) its threshold.

Electrons may be removed from floating gate 13 by coupling the control gate of device 12 to a voltage potential near ground. The drain of device 12 is then taken to a high voltage while the source floats. The application of a high bias to the drain of floating gate device 12—at the same time its control gate is being grounded—causes electrons to tunnel from the floating gate to the drain. This reduces (i.e., erases) the threshold of floating gate device 12.

Figure 3:
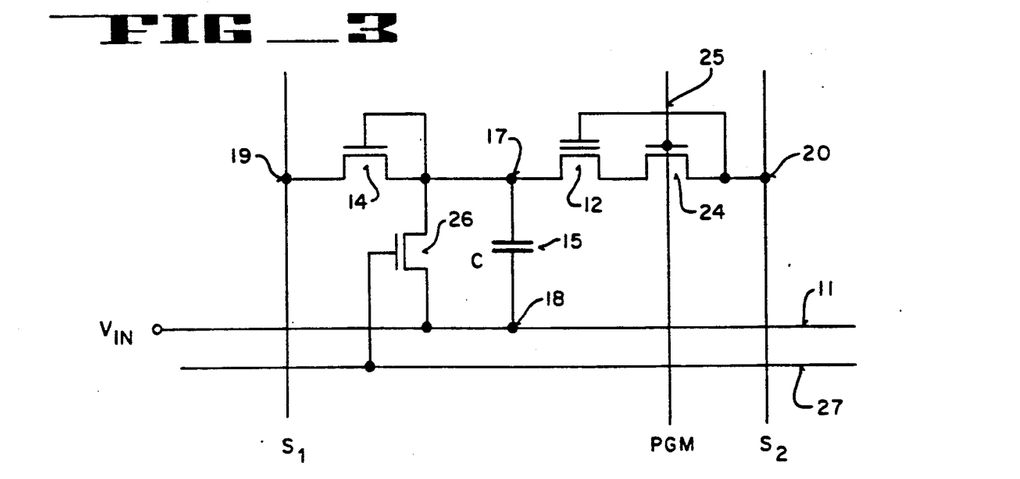
FIG. 3 shows the one-quadrant synapse cell of FIG. 1 with additional transistors incorporated to facilitate selective programming and erasing operations.

FIG. 3 illustrates the basic charge coupled synapse cell of FIG. 1 further incorporating a means for programming and erasing floating gate device 12. The additional means comprises an ordinary n-channel transistor 24 coupled in series between node 20 and floating gate device 12. An n-channel device 26 is also shown being coupled across capacitor 15 between nodes 17 and 18. Device 24 has its gate coupled to a programming line 25, while the gate of device 26 is coupled to a separate line 27.

During normal operation, line 27 is grounded and line 25 is raised to a high potential so that devices 24 and 26 are essentially removed from the circuits schematic of FIG. 3. For this situation, the circuit schematic of FIG. 3 reduces to the schematic of FIG. 1. During programming, line 25 is grounded such that device 24 disconnects the control gate of device 12 from its source/drain regions. This permits independent control of the control gate voltage via summing line $S_2$. Meanwhile, line 27, can be raised to a high potential to provide access to node 17 through device 26 and line 11.

Figure 9:
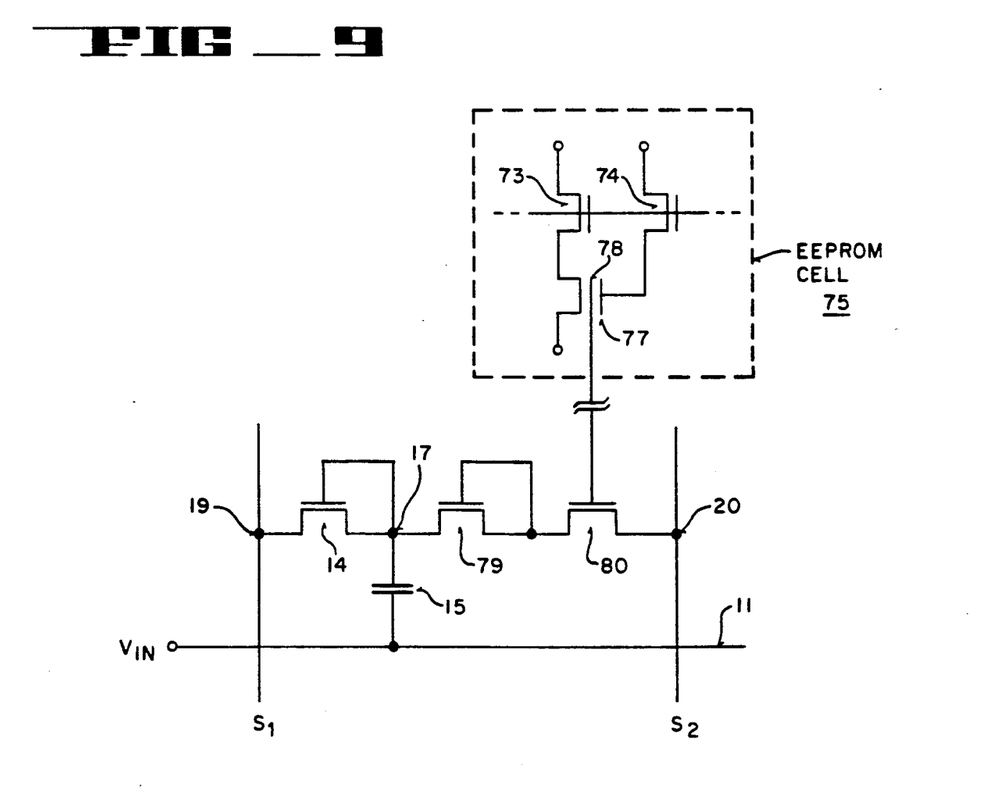
FIG. 9 illustrates an alternative embodiment utilizing a fully decoded EEPROM cell to facilitate programming and erasing operations.

A more direct approach to programming/erasing is illustrated in the circuit schematic diagram of FIG. 9. In FIG. 9, the threshold for the synapse is set by means of a fully-decoded EEPROM cell 75. Cell 75 includes a pair of transistors 73 and 74 which are utilized for selecting the drain and control gate of floating gate device 77 to program/erase floating gate 78. Floating gate 78 is coupled to (or commonly shared with) the gate of n-channel device 80. Device 80 and n-channel device 79 are shown connected in series between nodes 20 and 17. Collectively, devices 79 and 80 perform the same function as device 12 of FIG. 1. That is, the charge present on floating gate 78 represents the stored weight of the cell. Setting the threshold of device 78 also sets the threshold of device 80. At the same time, device 79 acts as a rectifier to prevent subsequent charge transfer back from node 17 to summing line $S_2$. In this implementation, $$V_{T2} = V_S - V_{FG}$$

It is appreciated that numerous alternative circuit configurations which provide a means for programming/erasing of floating gate device 12 are possible. Each is considered to be within the spirit and scope of the present invention.

Multi-Quadrant Operation

In each of the synapse cells discussed thus far both the inputs and the weights have been defined as being positive only. That is, a single-ended input has been shown being applied to a cell for the purpose of transferring charge from one summing line to the other. As mentioned earlier, this type of operation is referred to as one-quadrant operation. To obtain two-quadrant or four-quadrant functionality the basic synapse cell of FIG. 1 must be expanded, as discussed below.

Figure 4:
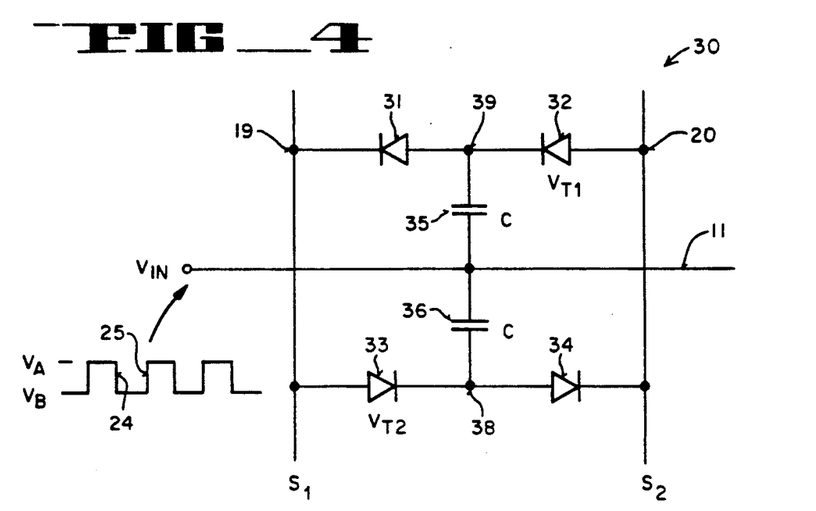
FIG. 4 illustrates an equivalent circuit schematic diagram which provides two-quadrant multiplication of an input voltage and a stored weight.

FIG. 4 illustrates a two-quadrant synapse cell 30 comprising devices 31-34. Each of the diodes represented in FIG. 4 is preferably implemented utilizing field-effect devices in the same manner as shown in the embodiment of FIG. 1. In particular, diode elements 32 and 33 are intended to each have separately programmable voltage thresholds $V_{T1}$ and $V_{T2}$, respectively. The currently preferred embodiment of synapse cell 30 comprises two floating gate devices (i.e., devices 32 and 33) and two n-channel field-effect devices (i.e., devices 31 and 34). The connections of each of these transistors is consistent with the current charge flow direction indicated by the diodes and with the previous discussion.

In a two-quadrant implementation, the stored weight within the cell is defined to allow charge to flow in one of two possible directions—either from summing line $S_2$ to summing line $S_1$, or vice versa—depending on the value of the weight stored in devices 32 and 33. Treating the weight as a binary term, a positive weight may be defined as allowing charge to pass from $S_2$ to $S_1$. For this convention, a negative weight passes charge from $S_1$ to $S_2$. Positive and negative weights can also be defined if charge is allowed to flow across both halves of synapse cell 30 (top and bottom central, about line 11). In this latter case, the net charge transferred determines the weight. In a two-quadrant synapse cell the input is still defined as a positive, i.e., single-ended, value.

To better appreciate the operation of synapse cell 30, consider the following example in which a positive weight is arbitrarily defined by the condition wherein $V_{T1} < V_A$; $V_{T2} > V_A$. By default, a negative weight is where $V_{T2} < V_A$; $V_{T1} > V_A$. To simplify the analysis, again assume that devices 31 and 34 are zero-threshold devices. When wordline 11 drops in potential from $V_A$ to 0 volts at transition 24, a similar drop in potential is experienced at nodes 39 and 38. Ignoring initial conditions, a drop in potential at nodes 38 and 39 causes a proportional transfer of charge from nodes 20 and 19 to respective nodes 38 and 39. Upon low-to-high transition 25, this charge packet (or a fraction thereof) is transferred to either of summing lines $S_1$ or $S_2$, depending on whether a positive or a negative weight pattern has been programmed into devices 32 and 33.

In accordance with the convention adopted above, if a positive weight has been programmed into cell 30, then low-to-high transition 25 produces a transfer of charge from node 39 to node 19. No charge transfer takes place from node 38 to node 20 since, for a positive weight, $V_{T2} > V_A$. Again, the programmed threshold $V_{T1}$ controls the amount of charge which is transferred from node 20 to node 39 in response to transition 24. Thus, a positive weight (as defined) only transfers charge from summing line $S_2$ to summing line $S_1$.

For a negative weight the condition is reversed; that is, charge is transferred from summing line $S_2$ to summing line $S_1$. For this situation, $V_{T1}$ is greater than $V_A$ and $V_{T2}$ is less than $V_A$ so that charge is transferred from node 38 to node 20 only. This charge transfer occurs in response to input voltage transition 25.

As before, and again ignoring initialization conditions, the total charge transferred during any time period can be calculated by the following relationships.

$$Q_T = N^*C^*(V_A - V_{T1}); \text{ (positive weights)}$$

$$Q_T = -N^*C^*(V_A - V_{T2}); \text{ (negative weights)}$$

Figure 5:
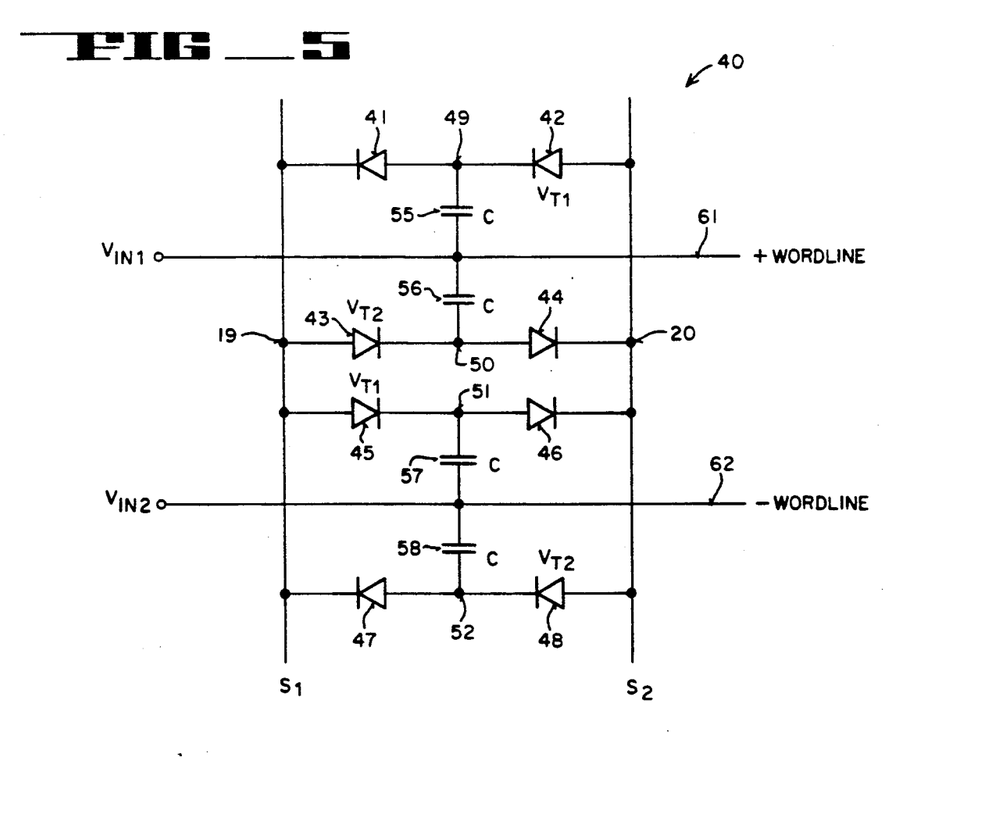
FIG. 5 illustrates an equivalent circuit schematic diagram of a four-quadrant synapse cell capable of multiplying a differential input with a stored weight. The output of the circuit of FIG. 5 is provided on a pair of output summing lines.

Synapse cell 40 of FIG. 5 illustrates a synapse cell which achieves four-quadrant operation. In a four-quadrant cell, positive and negative weights are both defined in the same way as for the two-quadrant cell 30 of FIG. 4. Additionally, both positively defined and negatively defined inputs are allowed.

With continuing reference to FIG. 5, four-quadrant charge domain synapse cell 40 comprises devices (e.g., equivalent diode elements) 41-48 and capacitors 55-58, arranged as shown between summing lines $S_2$ and $S_1$ and positive and negative wordlines 61 and 62, respectively. Devices 41-44 and capacitors 55 and 56 are preferably configured in the same manner as is shown in synapse cell 30 of FIG. 4. In other words, device element 41 is coupled between node 19 and node 49; device element 42 is coupled between node 49 and node 20, device element 44 is coupled between node 20 and node 50; and device element 43 is coupled between node 50 and node 19. Capacitor 55 couples wordline 61 to node 49, while capacitor 56 couples wordline 61 to node 50.

The bottom portion of cell 40 comprising devices 45-48 and capacitors 57 and 58, is simply a mirror-image of the top portion described above. Diode 46 is shown connected between node 20 and node 51; device element 45 is connected between node 51 and node 19; diode 47 is connected between node 19 and node 52; and device element 48 is connected between node 52 and node 20. Capacitors 57 and 58 couple wordlines 62 to nodes 51 and 52, respectively. As was the case in the two-quadrant cell, devices 42, 43, 45 and 48 each comprise a programmable element—preferably a floating gate device. For a digital implementation in which both positive and negative weights are stored within cell 40, devices 42 and 45 are programmed to the same voltage threshold $V_{T1}$. Likewise, devices 43 and 48 are programmed so as to have the same voltage threshold $V_{T2}$. To simplify the discussion, assume that positive and negative weights are defined as previously discussed in connection with cell 30 of FIG. 4.

Figure 6:
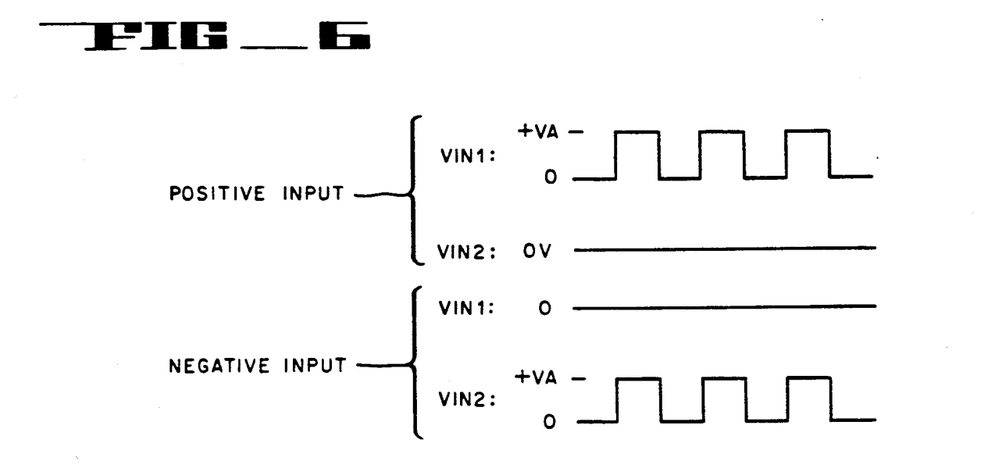
FIG. 6 illustrates one way of defining positive and negative inputs to the four-quadrant cell of FIG. 5.

Consider the operation of synapse cell 40, in view of the positive and negative input voltage conditions illustrated in FIG. 6. According to the convention of FIG. 6, a positive input is defined by the condition wherein wordline 62 is grounded and wordline 61 receives the input voltage pulse train $V_{IN1}$, as shown. For the case of a negative input this condition is reversed; that is, wordline 61 is grounded and a input voltage pulse train is applied to wordline 62. Whenever one of the wordlines 61 or 62 is grounded, no charge transfer or current flow takes place through the components associated with that half of the cell. Effectively, this portion of cell 40 is disabled or turned off. The other half of the cell receiving the input pulse train continues to operate in accordance with the principles described above in connection with the two-quadrant cell.

Thus, positive and negative inputs can also be defined with both inputs active. In this situation, a difference in the input frequencies determines whether the input is positive or negative. Alternatively, the number of pulses per fixed time period can be used to determine the sign of the input. A high frequency at $V_{IN1}$ relative to $V_{IN2}$ might be defined as a positive input, and vice versa. Note that this approach allows for the utilization of a constant reference frequency applied to one of the input lines. Input frequencies above or below this reference would then represent either a positive or a negative input.

Thus, a column of four-quadrant synapse cells 40 can be employed to calculate the vector inner product between an input pattern and a stored weight pattern. The analog charge difference generated between summing lines $S_1$ and $S_2$ would be directly related to the strength of the match between the input vector and stored weight pattern in such an array. Practitioners will further appreciate that the synapse cell of FIG. 5 performs an EXCLUSIVE-OR function—wherein a binary, digital input and a binary, digital weight are combined to produce an EXCLUSIVE-ORed binary, digital output.

Obviously, the cell of FIG. 5 can also be operated in an analog mode. For analog operation, the frequency (and/or amplitude) of the inputs varies over a continuous range of values. The programmed threshold voltages of devices 41-48 would also take on non-discrete values. It should be clear that numerous alternatives embodiments incorporating different input coding schemes or programming arrangements are possible. Each is considered to be well within scope of the present invention.

Consistent with the convention defined above for the synapse cell of FIG. 5, notice that the physical layout of synapse cell 40 on a semiconductor substrate may be optimized so that devices 42 and 45 share a common floating gate member. From a processing standpoint, this can be done by simply patterning the polysilicon layer, which forms the floating gates, into a single member coupled between the respective devices. Similarly, devices 43 and 48 can be fabricated so that they too share a common floating gate member. This type of arrangement could be advantageous in certain embodiments since only one programming means would be required to program the devices sharing the same floating gate.

Incorporation Within A Network

Figure 7:
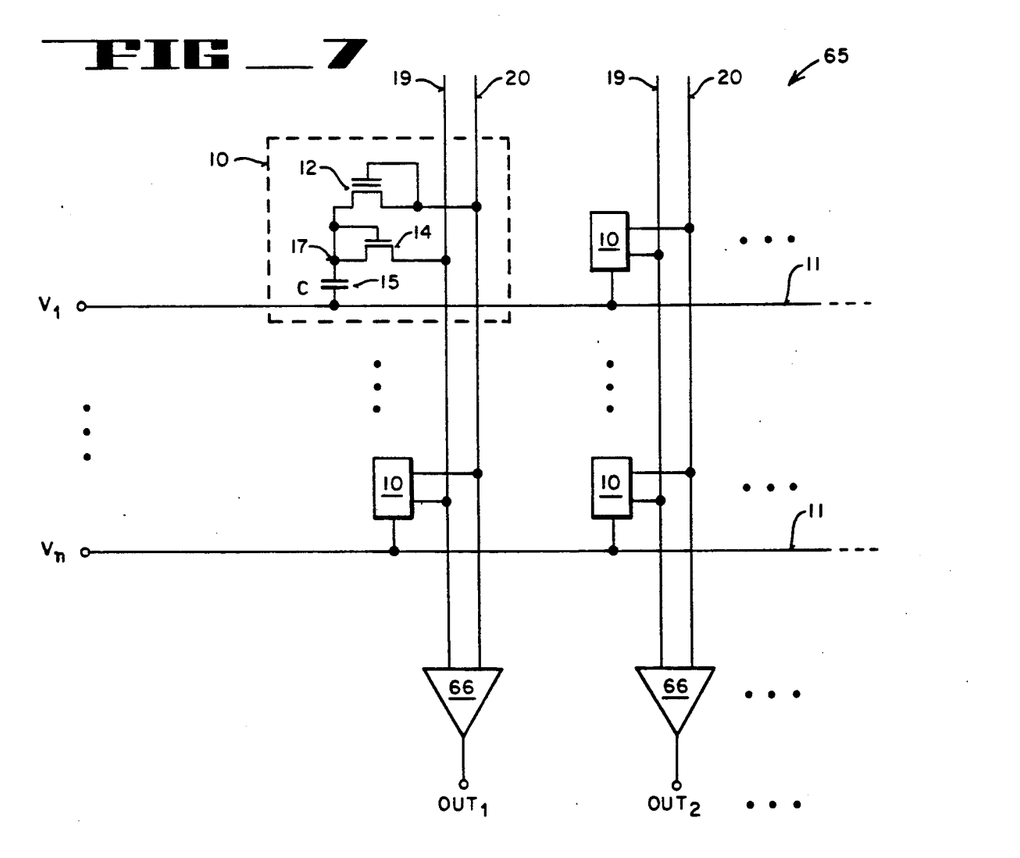
FIG. 7 is a circuit schematic of a neural network utilizing an array of one-quadrant synapse cells.

FIG. 7 illustrates how the basic synapse cell 10 of the present invention is preferably incorporated within a larger network array 65. Array 65 comprises a plurality of wordline inputs 11 coupled to receive input voltages $V_1$ through $V_{IN}$. Each of the input wordlines 11 is coupled through synapse cells 10 to a set of paired column summing lines 19 and 20. Each of the column summing lines 19 and 20 are terminated at a neural summing device 66. Devices 66 collectively produce a set of outputs labelled $OUT_1$, $OUT_2$, and so on.

Neural summing devices 66 normally comprise conventional operational amplifiers. If the difference in potential between lines 19 and 20 becomes large in one direction, further charge transfer in that direction becomes more difficult. In this way, the weighted sum of the applied input pulses acts like a type of automatic gain control for the neuron.

It is important to recognize that a fundamental advantage of the presently invented charge domain synapse cell—whether configured as a one-quadrant, two-quadrant or four-quadrant device—is that it obviates the need for currents continuously flowing down the column summing lines in the network. Furthermore, the transfer of charge packets in accordance with the present invention, from one node to another, closely resembles how an actual biological synapse functions. The representation of inputs as oscillatory waveforms also closely simulates the communication scheme of real biological cortices.

Another primary benefit of the invented charge domain architecture is that it permits the realization of a synapse array having extremely high densities with little concern for power dissipation. In fact, the charge domain synapse cell of the present invention permits a straightforward trade-off of speed versus power dissipation.

A further advantage of the present invention is that the synapse cells can be easily driven by digital systems. With the voltage levels of the input pulses being predetermined and fixed, the input pulse train need only run at a set frequency and, depending on the details of the implementation, for a finite duration. Thus, interfacing an integrated circuit based on the present invention to an existing digital system can be relatively easy to implement.

Resistive Operation

With reference again to FIG. 8, resistances 69 and 70 represent the effective series resistance associated with devices 14 and 12 of FIG. 1, respectively. From a practical standpoint, these resistances are inconsequential for the one-quadrant synapse cell depicted in FIG. 1. However, for two-quadrant and four-quadrant multiplication, these series resistance elements can provide results which may be desirable. In this situation, the field-effect devices are intentionally biased in their linear region to take advantage of the series resistance element for multi-quadrant embodiments.

Figure 10:
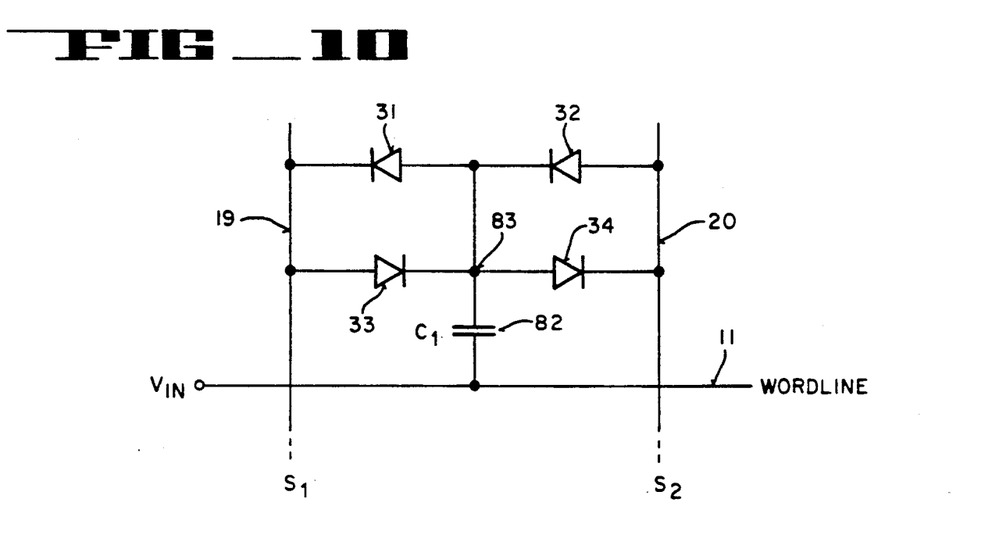
FIG. 10 shows an alternative embodiment of a two-quadrant charge-coupled synapse cell of the present invention.

FIG. 10 shows an alternative embodiment of the two-quadrant multiplying synapse cell of FIG. 4. The cell of FIG. 10 includes diodes 31-34 configured substantially the same as shown in FIG. 4 between summing lines S$_1$ and S$_2$. The difference between the cell of FIG. 4 and the alternative embodiment of FIG. 10, is that capacitors 35 and 36 have now been merged into a single capacitor 82 coupled between wordline 11 and intermediate node 83. Node 83 is commonly coupled to each of diodes 31-34. This arrangement, of course means that there are now two competing charging and discharging paths which exist at the common node 83. By redefining the weight such that devices 31 and 32 are "off" whenever devices 33 and 34 are "on" (and vice versa), proper synapse operation can be maintained. Note that this requires that all four diode elements 31-34 have a variable threshold (i.e., each must be implemented as a floating gate device).

Assuming that devices 31 and 34 of FIG. 10 are fabricated as zero-threshold devices (consistent with the description of FIG. 4) and are operated in the linear region, then the resistive effect of these devices must be taken into account in order to calculate the net charge transfer. Note that this arrangement reduces the complexity of the cell further.

Figure 11:
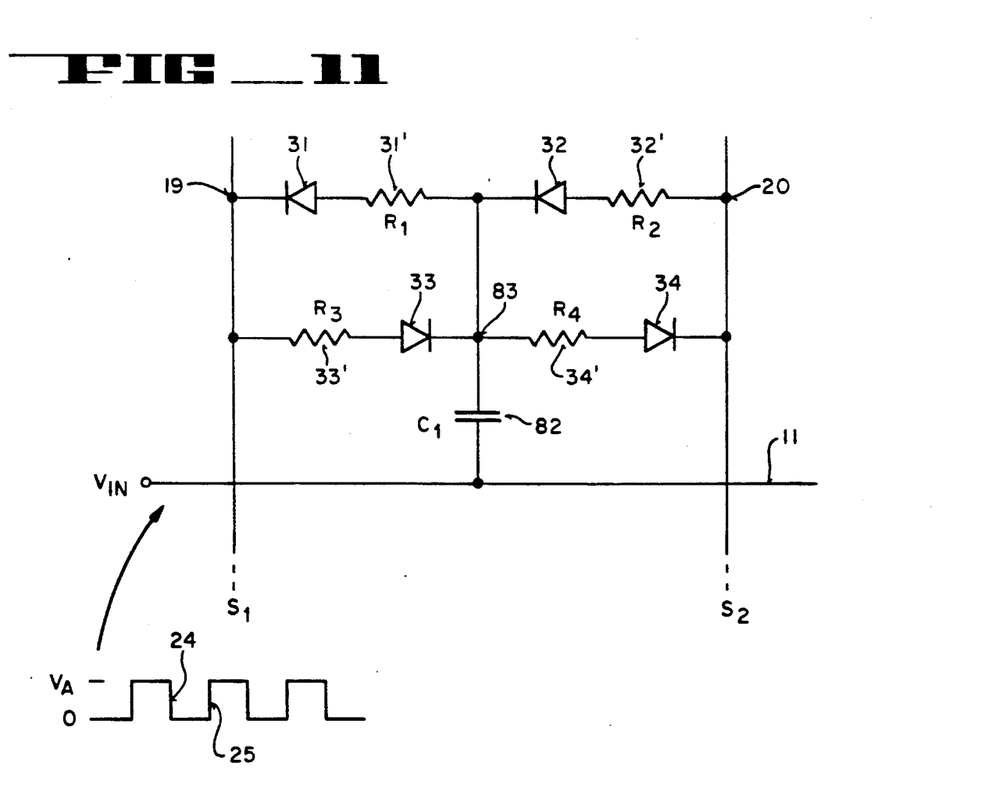
FIG. 11 shows an equivalent circuit schematic of the synapse cell of FIG. 10 with programmable resistive elements.

A more general analysis that would treat the four diode devices of FIG. 10 as having associated resistive elements is shown in FIG. 11. In the embodiment of FIG. 11, the weight is represented by the relative resistances, rather than by the relative thresholds of the floating gate devices. Diodes 31-34 are represented as ideal, zero-threshold devices having associated resistance 31'-34'. In this case, the pattern of resistance values $R_1$, $R_2$, $R_3$ and $R_4$ represent the weights.

One possibly is to define a positive weight as $R_2 < R_3$ and $R_4 = R_1$. In adopting this convention the negative weight is defined as $R_2 > R_3$ and $R_4 = R_1$ by default. For the case where the potentials on line 19 and 20 are equal (i.e., $S_1 = S_2$), upon a low transition 24, a transient current is induced across resistors $R_2$ and $R_3$ from summing lines $S_1$ and $S_2$, respectively. Assuming that the pulse widths are sufficiently long, the current through these resistors will persist until the voltage at node 83 equals either the $S_1$ or the $S_2$ voltage. Obviously, since $R_2 < R_3$ for a positive weight, more of the transient current will flow through $R_2$.

At the arrival of low-to-high transition 25, a transient voltage is established at node 83 equal to the potential on line $S_2$ plus the voltage $V_A$. In time, the voltage at node 83 decays to the voltage at either of summing lines $S_1$ or $S_2$ through resistances $R_1$ and $R_4$. The total charge transferred to either summing column will be the same and is controlled by the resistance values $R_1$ and $R_4$, the value of capacitor 82 and the amplitude of the input pulse. The net result is that a packet of charge gets transfered from $S_2$ to $S_1$ by the end of the transient period. Similarly, for a negative weight (as defined above) a charge packet gets transferred from summing line $S_1$ to line $S_2$.

The following analysis assumes a sharp rising transient edge 25 relative to the characteristic discharge time of capacitor 82. The potential at intermediate node 83 follows the typical RC transient equation where R represents the parallel combination of $R_3$ and $R_2$. For these conditions, the equation describing the operation of the cell of FIG. 11 is given by $$V_{83} = -v(t) + V_{S1}; \; V_{S1} = V_{S2}$$

$$v(t) = V_A e^{-t/RC_1}; \; R = R_2 R_3/(R_2 + R_3)$$

The instantaneous current flowing through resistors R3 and R2 are given by $v(t)/R_3$ and $v(t)/R_2$, respectively. By integrating these currents over time and taking the difference between them, the net charge transfered can be written as:

$$\text{Net } Q/\text{pulse} = \int_0^\infty \frac{v(t)}{r_2} dt - \int_0^\infty \frac{v(t)}{r_3} dt$$
$$= V_A C_1 (R_2 - R_3)/(R_2 + R_3)$$

Figure 12:
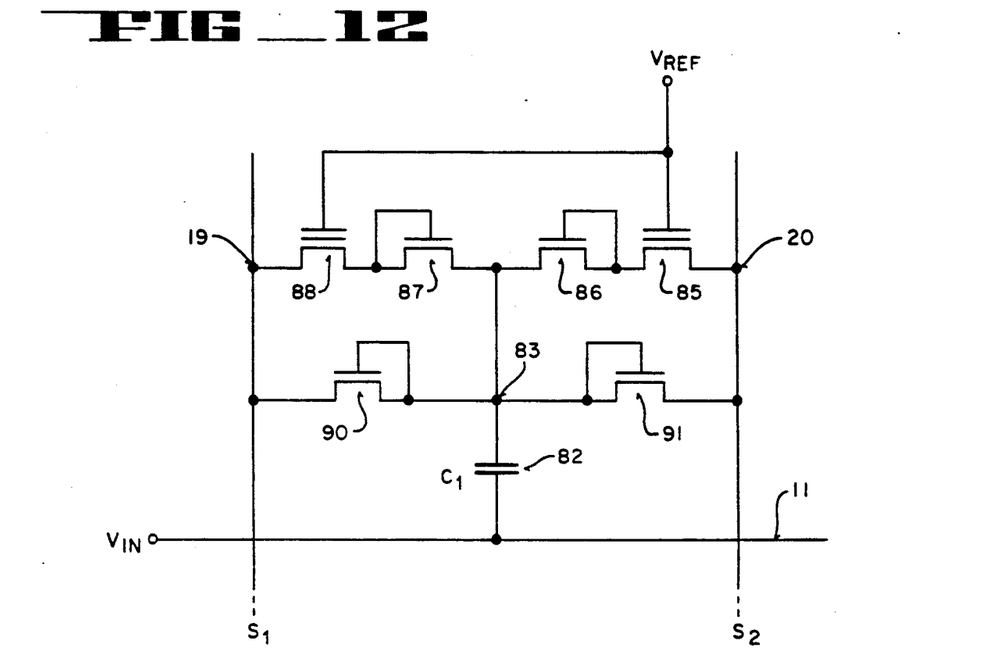
FIG. 12 shows one implementation the synapse cell of FIG. 10 utilizing field-effect transistors.

FIG. 12 shows one possible implementation of the synapse cell of FIG. 11 using MOS devices. FIG. 12 includes a floating gate device 85 coupled in series with field-effect device 86 between summing line 20 and intermediate node 83. Also coupled between summing line 20 and node 83 is a field-effect device 91 configured as a diode. On the other side of the cell, floating gate device 88 is coupled in series with field-effect device 87 between summing line 19 and node 83. Likewise, field-effect device 90 (configured as a diode) is coupled between line 19 and node 83. Input transitions are coupled from wordline 11 to node 83 through capacitor 82. Both of the floating gate devices 85 and 88 each have their control gates coupled to a reference potential $V_{REF}$. For reasons of clarity, FIG. 12, like earlier figures, does not explicitly show programming circuitry which can be used to program and erase charge from floating gate devices 88 and 85. Note however, that the programming approach of FIGS. 3 and/or FIG. 9 may be incorporated.

In the cell of FIG. 12, floating gate devices 88 and 85 control the relative resistances corresponding to resistors $R_2$ and $R_3$ of FIG. 11. Assuming that these devices are operated in the linear region, and that all devices have identical geometry and mobility constants, then the net charge can be expressed as follows $$\text{Net } Q = V_A C_1[(V_{gs88} - V_{gs85})/(V_{gs88} + V_{gs85})];$$

$$V_{gs} = (V_{fg} - V_{S1}) - V_{ti}$$

where $V_{gs}$ represents the gate-to-source voltage and where $V_{ti}$ is the intrinsic threshold voltage of the device. The quantity in the square brackets represents the modifiable portion of the weight. The input value is as before represented by the number of pulses or by a frequency value. Thus, the synapse cell of the present invention in its resistive embodiment also calculates a product of an input times a modifiable weight.

Note that in the special case where the average threshold of the two floating gate devices is kept constant over various weight changes, the weight becomes proportional to the difference in the threshold voltages.

Figure 14:
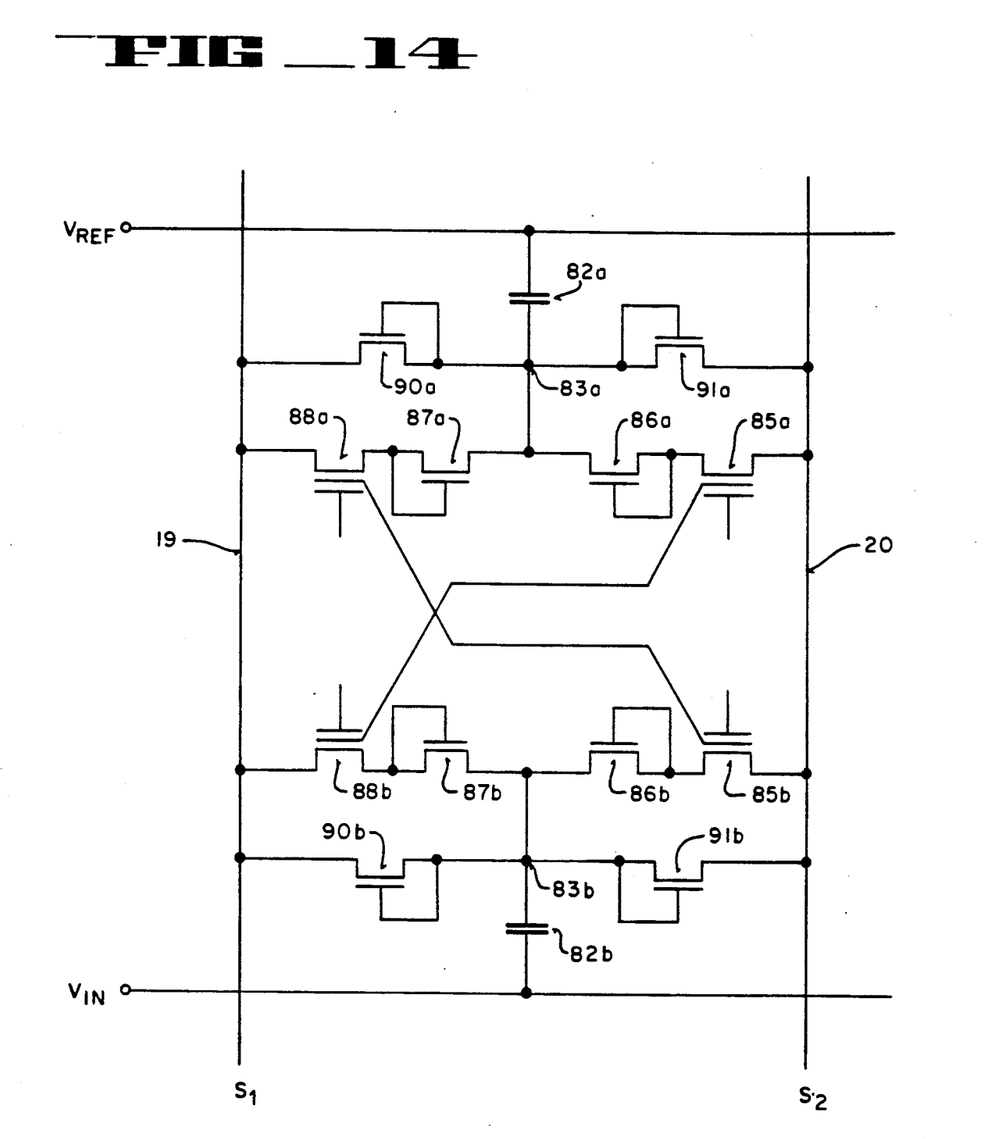
FIG. 14 is a circuit schematic diagram of a four-quadrant charge-coupled synapse cell formed as an extension of the cell of FIG. 12.

As previously described, expansion to a four-quadrant multiplier can be accomplished by repeating the structure of FIG. 12. A four-quadrant synapse cell formed in this fashion is illustrated in FIG. 14. In one half of the circuit of FIG. 12, the devices corresponding to the circuit of FIG. 12 includes the suffix "a" (e.g., 91a), and in the other half of the cell, the corresponding devices are indicated by the suffix "b" (e.g., 91b). As explained previously in connection with the cell of FIG. 5, the synapse cell of FIG. 14 may be driven by a reference frequency input coupled to node 83a through capacitor 82a. The input is then provided through capacitor 82b to node 82b. In this case, the floating gate potentials are reversed in order but of the same magnitude between floating gate devices 85a and 88a. Note that devices 88a and 85b are preferably arranged with a common floating gate element, whereas devices 85a and 88b also share a common floating gate.

The advantages of using the resistive method of charge transfer include the fact that the dynamic range of the weights can be expanded to negative thresholds. Also, one of the coupling capacitors can be eliminated without having to increase the modifiable floating gate devices. Moreover, the coupling efficiency of the input line to the common node 83 can be reduced while still maintaining functionality.

Figure 13:
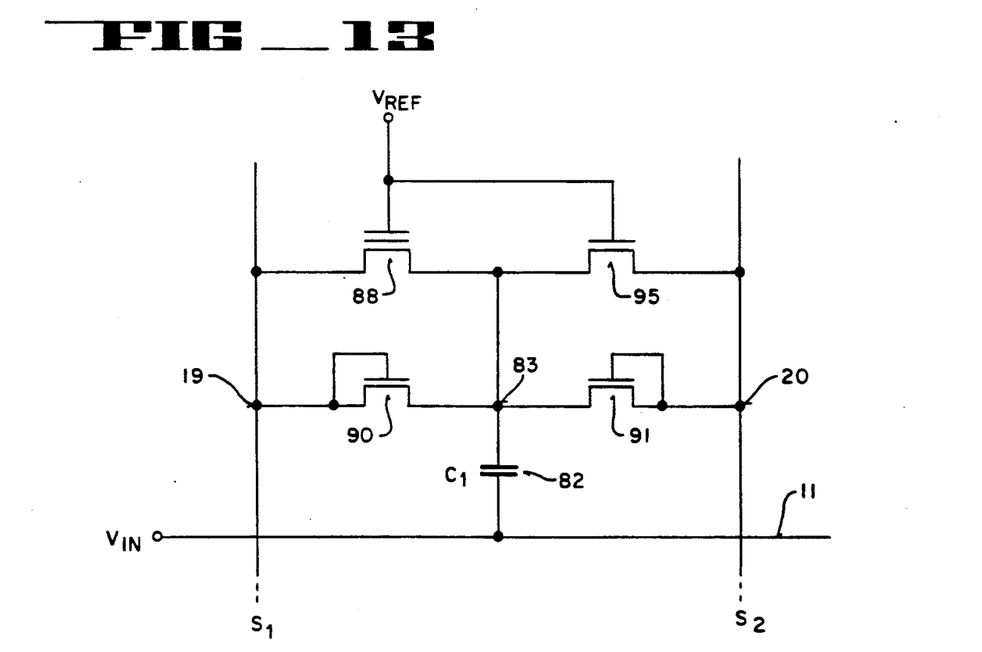
FIG. 13 shows a simplified alternative embodiment of the synapse cell of FIG. 10, again utilizing field-effect transistors.

FIG. 13 shows a further simplification of the two-quadrant resistive charge domain circuit discussed above. For this embodiment, the voltage potentials on summing lines $S_1$ and $S_2$ are required to be identical and constant for proper operation. In addition, the "on" resistance of devices 90 and 91 are required to be much lower than the effective resistance of floating gate device 88 and device 95. A "zero" weight is defined when devices 88 and 95 have equivalent resistances. This is to guarantee that the effect of the conductances of devices 88 and 95 can be neglected with respect to devices 90 and 91 when charging node 83. A positive weight is programmed when floating gate device 88 has a higher resistance than device 95, while a negative weight results when device 95 has a higher resistance than device 88. In other respects, the operation of the synapse cell of FIG. 13 is the same as discussed earlier in connection with FIGS. 10 and 11.

Whereas many alternations and modifications to the present invention will no doubt become apparent to the person of ordinary skill in the art after having read the foregoing description, it is to be understood that the particular embodiments shown and described by way of illustration are no way intended to be considered limiting. For example, although this disclosure has shown the use of floating gate devices for storing a weight pattern, and illustrated the operational nature of each of the field-effect devices as diode elements, other devices (such as volatile memory devices) could be also be used without detracting from the spirit or scope of the present invention. Therefore, reference to the details of the illustrated circuits is not intended to limit the scope of the claims which themselves recite only those features regarded as essential to the invention.

I claim:

1. A charge domain synapse cell comprising:
   an input node;
   first and second summing lines having associated first and second potentials, respectively;
   a capacitor coupled between an intermediate node and said input node;
   a first device means having a programmed voltage threshold for transferring a packet of charge from said second summing line to said intermediate node in response to a high-to-low voltage transition at said node;
   a second device means for transferring said charge packet from said intermediate node to said first summing line in response to the next low-to-high voltage transition following said high-to-low transition, at said input node.

2. The synapse cell of claim 1 wherein the magnitude of said charge packet transferred is a function of the capacitance of said capacitor, the magnitude of said transitions and said programmed voltage threshold.

3. The synapse cell of claim 2 wherein at least said second summing line is initially charged to a reference potential.

4. The synapse cell of claim 3 wherein said first device means comprises a floating gate device programmed to hold a charge to establish said voltage threshold, said charge representing a stored weight.

5. The synapse cell of claim 4 wherein said second device means comprises a field-effect device.

6. The synapse cell of claim 5 further comprising a means for programming said floating gate device.

7. The synapse cell of claim 6 wherein said first and said summing lines are differentially coupled to the input of a neural summing device.

8. The synapse cell of claim 4 wherein application of a fixed number of voltage pulses to said input node transfers a total charge from said second summing line to said first summing line which is proportional to the product of said fixed number of pulses, said weight and said capacitance.

9. A neural network comprising a plurality of input wordlines and a corresponding plurality of column summing lines, pairs of said column summing lines being differentially coupled to an associated neural summing device, said network further comprising an array of synapse cells providing weighted connections between said input wordlines and said column summing lines, each of said synapse cells comprising:

a programmable floating gate device having a floating gate, a control gate and said first and second spaced-apart doped regions formed in a semiconductor substrate, said first doped region being coupled to a first column summing line charged to a reference potential, with a second doped region being coupled to a charging node, said floating gate storing a charge which establishes the threshold of said floating gate device, said charge corresponding to a weight;

a semiconductor device for coupling said charging node to a second column summing line, said first and second column summing lines comprising one of said pairs;

a capacitance coupled between said charging node and an input wordline, said capacitance coupling voltage transitions on said input wordline to said charging node;

each cell being operational such that whenever a high-to-low voltage transition occurs on said wordline which causes the voltage at said charging node to drop below said reference potential minus said threshold, a packet of charge is transferred from said first column summing line to said charging node said charge packet, or a fractional portion thereof, being transferred to said second column summing line in response to subsequent low-to-high transition on said input wordline.

10. The network of claim 9 wherein the amount of charge transferred from said first to said second column summing lines is proportional to the product of said weight, the amplitude of said transitions and said capacitance.

11. The network of claim 10 further comprising a means for programming said floating gate device.

12. The network of claim 11 wherein said semiconductor device comprises a first field-effect device configured as a diode so that current flow is directional from said charging node to said second column summing line.

13. The network of claim 12 wherein the total charge transferred from said first to said second column summing lines during a certain time period is proportional to the product of the number of said transitions occurring within said time period, said amplitude of said transitions, said weight and said capacitance.

14. The network of claim 13 wherein said programming means comprises:

a second field-effect device coupled in series between said charging node and said input wordline, the gate of said second field-effect device being coupled to a first programming line such that when said first programming line is raised to a high positive potential, said second field-effect device connects said input wordline directly to the drain of said floating gate device;

a third field-effect device coupled in series between said first doped region of said floating gate device and said first column summing line, the gate of said third field-effect device being coupled to a second programming line such that when said second programming line is grounded, the control gate of said floating gate device is disconnected from said second region, yet said control gate remains coupled to said first column summing line.

15. The network of claim 14 wherein said neural summing device implements a Sigmoid function.

16. A semiconductor synapse cell for transferring charge from a first to a second summing line in response to an input voltage pulse comprising:

a capacitor means for coupling the voltage transitions associated with said pulse to an internal node within said cell;

first semiconductor device means for transferring a packet of charge from said first summing line to said internal node in response to a first transition of said pulse; and second semiconductor device means for transferring said charge packet, or a fraction thereof, to said summing line in response to a second transition of said pulse.

17. The synapse cell of claim 16 wherein said first semiconductor device means comprises a first field-effect device.

18. The cell of claim 17 wherein said first field-effect device comprises a floating gate device.

19. The synapse cell of claim 18 wherein said first semiconductor device means further comprises a second field-effect device coupled in series with said first field-effect device, said second field-effect device being configured as a diode.

20. The synapse cell of claim 19 wherein said second semiconductor device means comprises a third field-effect device configured as a diode.

21. The synapse cell of claim 17 further comprising means for programming said first field-effect device.

22. The synapse cell of claim 21 wherein said programming means comprises a fully-decoded EEPROM cell.

23. The synapse cell of claim 18 further comprising means for programming said floating gate device.

* * * * *